March 17, 1953 V. E. GLEASMAN 2,631,475
DIFFERENTIAL
Filed Aug. 2, 1949 2 SHEETS—SHEET 1
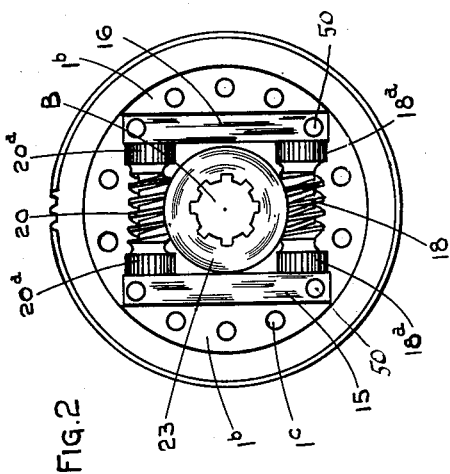
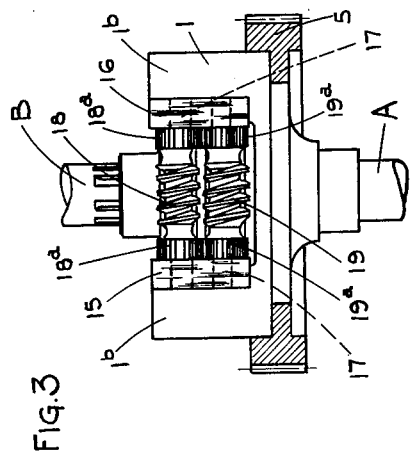
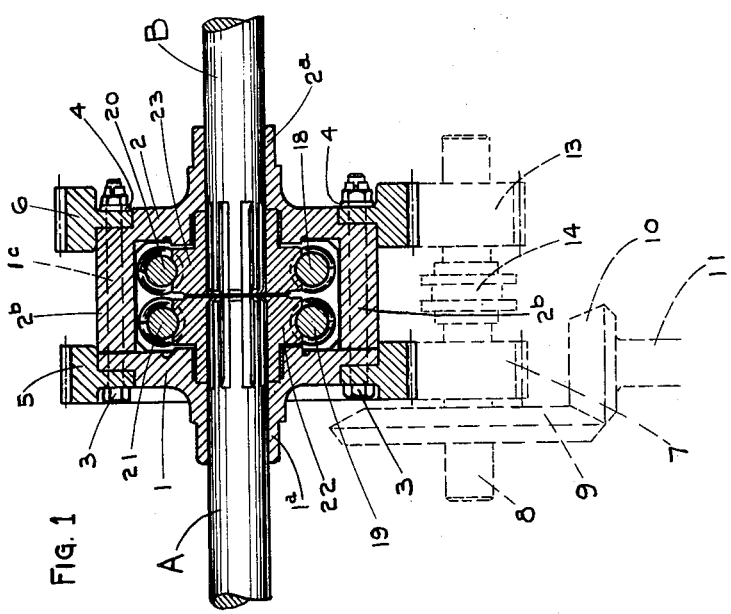
INVENTOR.
Vernon E. Gleasman
BY
ATTORNEYS

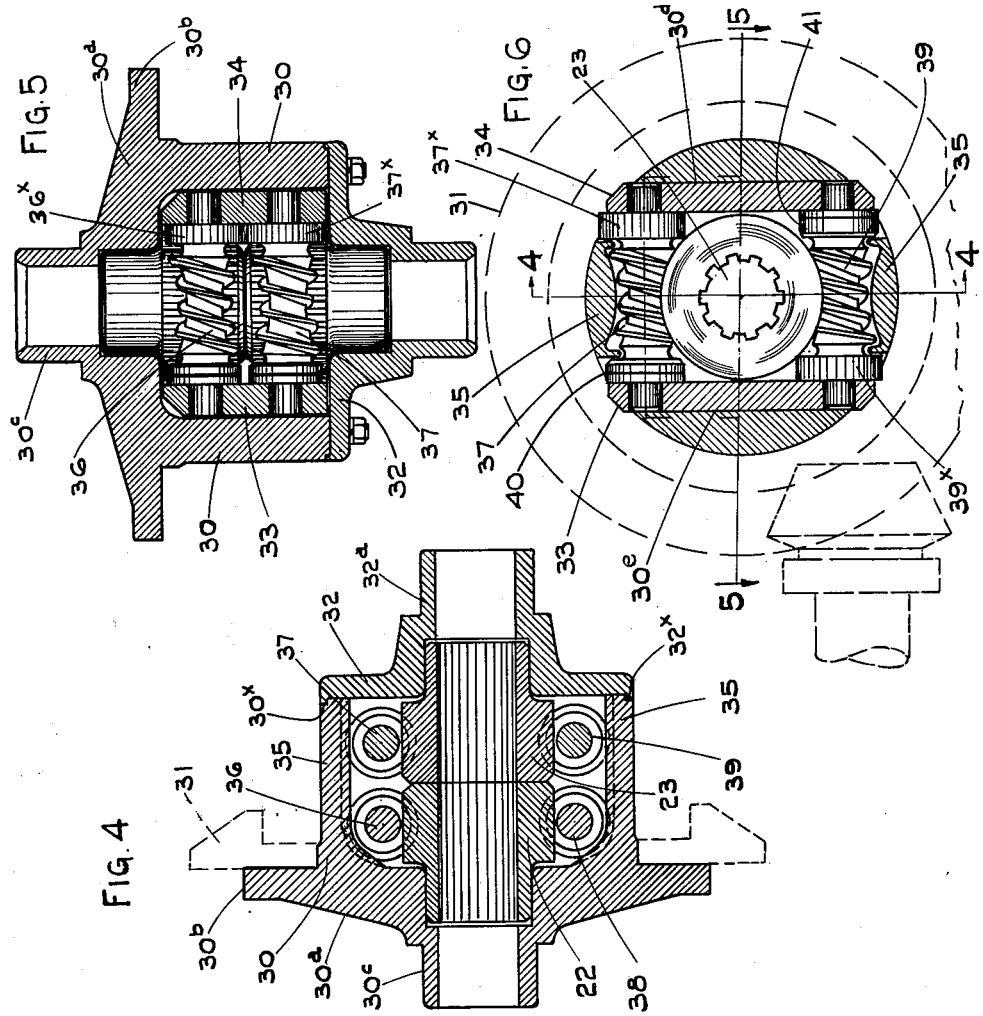

Patented Mar. 17, 1953

2,631,475

UNITED STATES PATENT OFFICE 2,631,475

DIFFERENTIAL

Vernon E. Gleasman, Elmira, N. Y.

Application August 2, 1949, Serial No. 108,160

5 Claims. (Cl. 74—715)

This invention is a novel improvement in positive type differentials for trucks or automobiles, or may be used between sets of axles as a positive equalizer, and the principal object thereof is to provide a differential of the above type embodying as a cartridge unit an arrangement of worm gears or the like, so arranged as to provide a very compact and rugged unit which may be readily assembled and disassembled, and which will permit utilizing a ring gear and ring gear carrier of ordinary size, the differential being particularly characterized by simplicity of machining of the various interfitting parts.

Other minor objects of the invention will be hereinafter set forth.

I will explain the invention with reference to the accompanying drawings, which illustrate several practical embodiments thereof, to enable others familiar with the art to adopt and use the same; and will summarize in the claims the novel features of construction, and novel combinations of parts, for which protection is desired.

In said drawings:

Figure 1 is a longitudinal section through one modification of my novel differential, showing in dotted lines the gearing and clutch arrangement for conventional two-speed double reduction differentials.

Fig. 2 is an end view of the face of one of the segments of the differential gear carrier, showing the cartridge unit in place.

Fig. 3 is a side elevation of the gear carrier shown in Fig. 2; also showing an end view of the cartridge unit within the carrier.

Fig. 4 is a longitudinal section through a modified differential, particularly adapted for application to standard type automobiles or trucks, the same being a section on the line 4—4, Fig. 6.

Fig. 5 is a section through the differential, taken on the line 5—5, Fig. 6.

Fig. 6 is a transverse section through the housing shown in Figs. 4 and 5.

As shown in Figs. 1 to 3, my novel differential comprises a pair of opposed gear carriers 1 and 2 having axial extensions 1a and 2a receiving the ends of the axle sections A and B which are aligned in the usual manner, the adjacent faces of the carriers 1 and 2 being provided with diametrically opposed segmental lugs 1b and 2b respectively disposed 180° apart, the outer edges of which are arcuate while the inner faces are straight and parallel in each of the carriers 1 and 2, whereby, as the parts are assembled, as shown in Fig. 1, the segmental lugs 1b and 2b will form a circular housing between the webs of the gear carriers, enclosing a chamber of square or rectangular shape, to receive the correspondingly shaped cartridge unit, hereinafter described.

Extending through the lugs 1b—2b are holes 1c for the reception of bolts 3, provided with nuts 4 for holding the carriers together as a rigid unit. The gear carrier 1 carries an annular spur gear 5, of conventional type, provided with an internal annular flange which is perforated to receive the bolts 3. As shown in Fig. 1, the gear 5 is of sufficient width to overlap the adjacent peripheral edge of the lugs 2b of the gear carrier 2 so as to serve as a pilot in holding the gear carriers together.

The gear carrier 2 carries an annular spur gear 6 having an internal annular flange which is also perforated to receive the bolts 3 and, as shown in Fig. 1, the width of gear 6 is such as to overlie and pilot the outer peripheral edge of the lugs 1b of the gear carrier 1. By thus piloting the four segmental lugs of the gear carriers 1 and 2 by means of the gears 5 and 6, the parts are rendered self-centering.

The conventional drive shown in dotted lines in Fig. 1 includes a gear 7 constantly meshing with the gear 5 and carrier by shaft 8, which also carries a beveled gear 9 meshing with a drive pinion 10 on drive shaft 11, the shaft 8 also carrying a spur gear 13 in constant mesh with the gear 6, suitable clutch means, indicated at 14, being interposed between the gears 7 and 13 so that shifting of clutch 14 will lock one of the gears 7 (or 13) to shaft 8, and shifting in the opposite direction will lock the other gear 13 to shaft 8, unlocking the other gear 7. The above arrangement is purely conventional and forms no part of my present invention, the same being intended for two-speed double-reduction differentials.

As shown, the cartridge unit comprises a pair of spaced parallel plates 15 and 16, of rectangular shape, the same being of length equal to the length of the inner straight walls of segmental lugs 1b, each plate having bores 17 at its ends for receiving the ends of the shafts of worms 18, 19, 20 and 21, the worms 18—19 being journaled one adjacent the other at one end of the plates 15—16, and the gears 20—21 being journaled one adjacent the other at the other ends of plates 15—16.

By the above construction, the cartridge, including the plates 15—16 and the worms 18 to 21 can be readily assembled and disassembled as a unit and placed in the box-like housing when the gear carriers are separated. Obviously, bolts 50 (Fig. 2) may be utilized to hold the cartridge unit in place if desired.

On the shaft A within the housing is a worm wheel 22 having a hub which is keyed to the shaft A, while on the axle section B within the housing is a similar worm wheel 23, worm wheel 22 being in constant mesh with the worms 19 and 21, while worm wheel 23 is in constant mesh with the worms 18 and 20. As shown in Fig. 3, worms 18 and 19 carry spur gears 18a and 19a at each end, which are in constant mesh, while the worms 20 and 21 each carry similar spur gears 20a, which are also constantly in mesh.

By the above construction, the power from the prime mover is transferred through drive shaft 11 to one or the other of the ring gears 5 or 6 so as to drive the carrier 1—2, carrying with it the cartridge unit consisting of the plates 15 and 16 and the worms 18 to 21. By reason of the constant intermeshing of the spur gears 18a—19a, and the spur gears 20a, the load on the axle sections A and B will be constantly equalized since the tendency of the pairs of worms would be to rotate in opposite directions.

The helical angle of the worms is such that it prevents one wheel or the other from spinning, due to loss of traction, while having the ability to follow when the road surface controls the difference in axle speed, such as when rounding a curve or any irregular terrain.

In the modifications shown in Figs. 4, 5 and 6, the gear carrier is substantially the same as the conventional automobile differential, the same comprising an annular member 30 open at one end and having an integral web 30a at the other end provided with a peripheral flange 30b, to which the bevel ring gear 31 (Figs. 4 and 6) is secured in the usual manner, the end plate 30a having a tubular hub extension 30c adapted to receive the end of one axle section.

The open end of the gear carrier 30 is normally closed by a plate 32 having a tubular extension 32a adapted to receive the end of the other axle section, the extensions 30c and 32a forming the bearings upon which the entire differential housing rotates. Preferably the member 30 has an annular recess 30x at its outer end receiving an annular flange or lip 32x forming a pilot, and whereby the axes of the tubular extensions 30c and 32a are maintained in alignment. In Fig. 4, the respective axle sections A and B are not shown.

The tubular member 30, as shown in Fig. 5, is provided with a chamber with cut-out portions, shown more particularly in Fig. 6, having two parallel sides 30d and 30e which receive the side plates 33 and 34 of the cartridge unit, which are generally similar to the side plates 15 and 16 shown in the preceding modification, the cartridge being insertable in the chamber through the open end of the tubular portion of member 30 when the plate 32 is removed therefrom. Forming part of the tubular member 30 are lips or projections 35 (Figs. 4 and 6) which are disposed at an angle of 90 degrees to the surfaces 30d and 30e and assist as a pilot in holding the cover 32 in proper assembled relation to the tubular member 30.

By the above construction the entire cartridge unit may be readily inserted or removed from its normal position within the chamber in tubular member 30 when the plate 32 is removed; and its construction lends itself readily to simple machining operations, which are inexpensive to perform.

In this modification the cartridge unit comprises the plates 33 and 34 which, as in the preceding modification, are provided with upper and lower bores adjacent their ends which receive the shafts of worms 36—37, and the shafts of worms 38—39, arranged as in the previous modification. However, in this modification, spur gears 36x and 37x (Fig. 5) are provided on the worms 36—37 at one end thereof, while at the opposite end of the worms 38—39 are spur gears 39x (Fig. 6) which are constantly in mesh.

As shown in Figs. 5 and 6, thrust bearings 40 are provided between the ends of the worms 36—37 opposite from gears 36x—37x. Also, thrust bearings 41 (Fig. 6) are provided between the opposite ends of the gears 39x for the worms 38—39, so as to receive the torque in the normal forward direction or rotation of the differential.

By the above construction, the cartridge unit, consisting of side plates 33 and 34 and the worms 36, 37, 38, 39, together with their thrust bearings 40 and 41, are insertable as a unit and removable as a unit from the correspondingly shaped chamber in the tubular member 30.

As in the previous modification, the ends of the axle sections within the tubular portion 30 are provided with worm wheels 22 and 23 respectively, which are splined on the ends of the axle sections, the worm wheel 22 being in constant mesh with the worms 36 and 38 while the worm wheel 23 is in constant mesh with the worms 37 and 39.

The operation of the differential shown in Figs. 4 to 6 is the same as previously described, although the worms 36 to 39 inclusive are shown as being of the hour-glass type rather than the straight type.

I do not limit my invention to the exact forms shown in the drawings, for obviously changes may be made therein within the scope of the claims.

I claim:

1. A differential for connecting aligned shaft sections or the like comprising a gear carrier provided with opposed axial hub extensions receiving the ends of the shaft sections, said carrier having an axial chamber therein formed by segmental portions disposed substantially 90° apart forming a substantially rectangular housing; means for rotating the carrier; and a substantially rectangular differential unit within the housing, said unit being readily removable from said housing; said unit comprising a pair of spaced parallel plates of length equal to opposite side walls of the rectangular housing, said plates having pairs of bores at their ends; shafts having their ends journaled in said pairs of bores; and thrust bearings on the shafts interposed between said shafts and the parallel plates to receive the torque in the normal forward direction of rotation of the differential.

2. A differential for connecting aligned shaft sections or the like comprising a gear carrier provided with opposed axial hub extensions receiving the ends of the shaft sections, said carrier having an axial chamber therein formed by segmental portions disposed substantially 90° apart forming a substantially rectangular housing; means for rotating the carrier; and a substantially rectangular differential unit within the housing, said unit being readily removable from said housing; said gear carrier comprising an annular member open at one end and having a web at the other end provided with a peripheral flange, said web having a tubular hub extension forming a journal for one shaft section; said segmental lugs being formed integrally with said annular member whereby the cartridge unit is insertable in and removable through said open end of the annular member; and an end plate removably secured to the outer ends of the lugs and having a tubular hub extension forming a journal for the other shaft section.

3. In a differential as set forth in claim 2, said rotating means comprising a gear on the end plate having a flange whose inner periphery contacts the outer faces of the segmental lugs, thereby providing a rigid construction.

4. In a differential as set forth in claim 2, said segmental lugs being piloted into the end plate, whereby the thrust developed in said differential unit will be restrained.

5. In a differential as set forth in claim 2, said segmental lugs having annular externally facing lips at their outer ends receiving correspondingly shaped inwardly facing portions on the end plate whereby thrust developed in said differential unit is restrained.

VERNON E. GLEASMAN.

REFERENCES CITED

The following references are of record in the file of this patent:

UNITED STATES PATENTS

| Number | Name | Date |
| --- | --- | --- |
| 691,591 | Brown | Jan. 21, 1902 |
| 1,030,379 | Benson | June 25, 1912 |
| 1,354,937 | Alcorn | Oct. 5, 1920 |
| 1,365,756 | Williams | Jan. 18, 1921 |
| 1,404,791 | Nogrady | Jan. 31, 1922 |
| 1,988,183 | Whitcomb | Jan. 15, 1935 |
| 2,000,223 | Du Pras | May 7, 1935 |
| 2,178,613 | Seeck | Nov. 7, 1939 |
| 2,559,916 | Gleasman | July 10, 1951 |